United States Patent
Hua

(10) Patent No.: US 9,586,352 B2
(45) Date of Patent: Mar. 7, 2017

(54) METHOD FOR MANUFACTURING A FAUCET COMPONENT

(71) Applicant: Meijie Faucet Co., Ltd., Shenzhen (CN)

(72) Inventor: Luo Xiao Hua, Shenzhen (CN)

(73) Assignee: Guangdong Meijie Faucet Company Limited, Dongguan (CN)

( * ) Notice: Subject to any disclaimer, the term of this patent is extended or adjusted under 35 U.S.C. 154(b) by 0 days.

(21) Appl. No.: 14/644,816

(22) Filed: Mar. 11, 2015

(65) Prior Publication Data
US 2016/0263796 A1 Sep. 15, 2016

(51) Int. Cl.
*B29C 45/14* (2006.01)
*B29L 31/24* (2006.01)
*B29L 1/00* (2006.01)

(52) U.S. Cl.
CPC ..... *B29C 45/14778* (2013.01); *B29L 2001/00* (2013.01); *B29L 2031/24* (2013.01)

(58) Field of Classification Search
None
See application file for complete search history.

(56) References Cited

U.S. PATENT DOCUMENTS

| | | | | |
|---|---|---|---|---|
| 2,337,550 A | * | 12/1943 | Crosby | B29C 45/14778 264/250 |
| 2,367,809 A | * | 1/1945 | Stein | B29C 45/14622 137/801 |
| 3,630,223 A | * | 12/1971 | Schaverien | F16K 19/006 137/327 |
| 5,399,417 A | * | 3/1995 | McNamara | B32B 15/08 264/126 |
| 5,579,808 A | * | 12/1996 | Mikol | E03C 1/0404 137/375 |
| 6,601,296 B1 | * | 8/2003 | Dailey | H01R 13/035 164/98 |
| 8,376,025 B2 | * | 2/2013 | Erhard | B29C 45/0084 164/103 |
| 2004/0035548 A1 | * | 2/2004 | Koide | B22D 19/14 164/98 |

(Continued)

FOREIGN PATENT DOCUMENTS

| | | | |
|---|---|---|---|
| CN | 202790664 | * | 3/2013 |
| CN | 102155577 | * | 6/2013 |

(Continued)

OTHER PUBLICATIONS

English machine translation of CN202790664.*

*Primary Examiner* — Edmund Lee
(74) *Attorney, Agent, or Firm* — Greer Burns & Crain Ltd.

(57) ABSTRACT

A faucet spout or other component has a metal housing with a plastic liner in an opening in the housing. The faucet component is made by first molding a plastic insert having an elongated body and an opening extending through the elongated body from a first end to a second end. The plastic insert is secured inside of a metal mold. The metal mold is heated (or cooled) to a temperature below the melting temperature of the molded plastic and molten metal is poured in the mold. The molded melting temperature of the plastic is high enough and the metal mold temperature is low enough so that the insert does not melt during the metal molding process.

7 Claims, 7 Drawing Sheets

(56) References Cited

U.S. PATENT DOCUMENTS

2006/0231231 A1\* 10/2006 McCullough .......... B22D 19/08
                                                    164/113
2013/0299026 A1   11/2013 Gossing et al.

FOREIGN PATENT DOCUMENTS

| CN | 203036037 | 7/2013 |
| CN | 103291994 | 9/2013 |
| WO | WO2011/160558 | \* 12/2011 |

\* cited by examiner

METHOD FOR MANUFACTURING A FAUCET COMPONENT

This invention relates to faucets, and more particularly to faucet spouts and other faucet components having a plastic insert.

BACKGROUND OF THE INVENTION

Most faucet spouts are metal made by cast molding. Modern faucet spouts have a plastic liner inside of a metal housing to avoid lead or other contamination from the metal. The plastic liner is made separately, and placed inside of the molded metal housing, sometimes by hand. The plastic prevents contaminants in the metal from entering the water, but the liner is loose inside of the spout, and sometimes kinks. Thus, there is a need for faucet spouts that have a tight fitting liner that does not kink, and a method for making such spouts.

Accordingly, one object of this invention is to provide a new and improved faucets.

Another object is to provide new and improved faucet spouts and other faucet components that have a plastic liner.

SUMMARY OF THE INVENTION

In keeping with one aspect of this invention, a faucet spout and other faucet component has a metal housing with a plastic liner in an opening in the housing. The faucet component is made by first molding a plastic insert having an elongated body and an opening extending through the elongated body from a first end to a second end. The plastic insert is secured inside of a mold and the housing is made by pouring molten metal in the mold. The temperature of the metal mold for the metal is low enough that the plastic does not melt when the molten metal is introduced into the mold.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
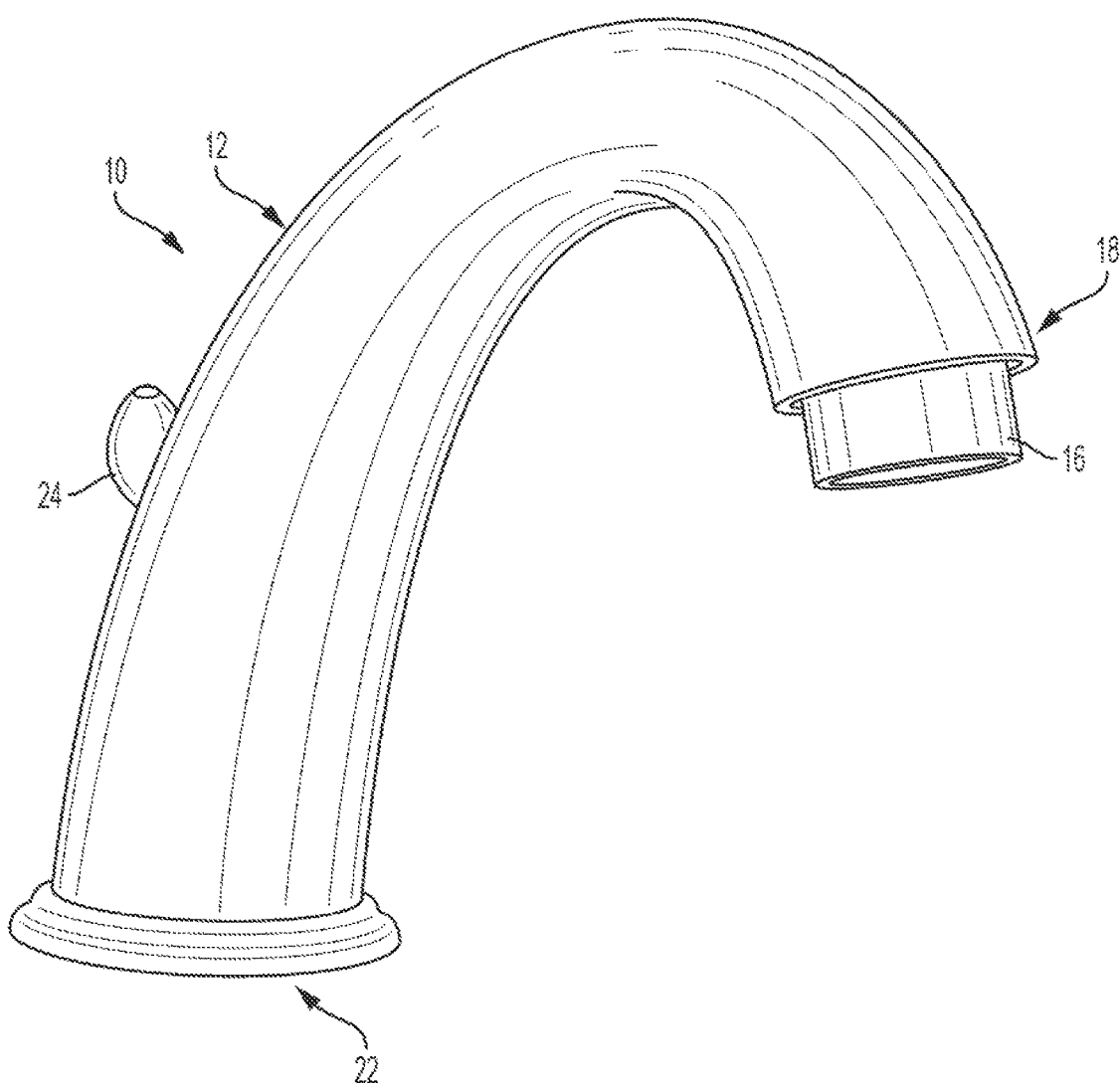
FIG. 1 is a perspective view of a faucet spout made in accordance with the present invention.
Figure 2:
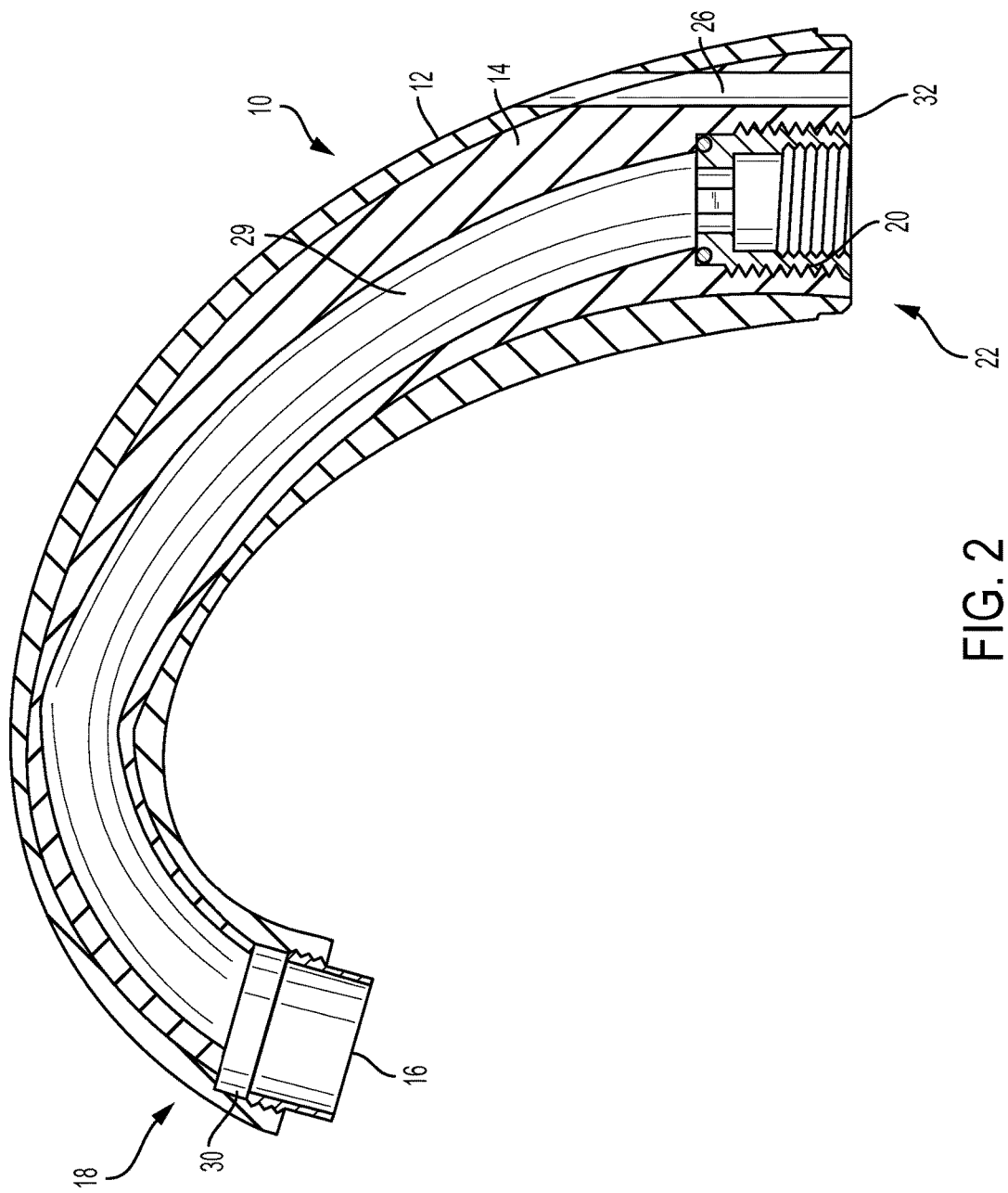
FIG. 2 is a sectional view of the faucet spout of FIG. 1.

As seen in FIGS. 1 and 2, a faucet spout 10 has a metal housing 12 with a plastic liner 14 inside of the housing. A water filter 16 is threadedly secured to the spout 10 at a first end 18, and threads 20 are provided at a second end 22 (FIG. 2). The threads 20 are used to connect the spout 10 to a plumbing system. A drain controller 24 includes a rod (not shown) that passes through an opening 26.

Figure 3:
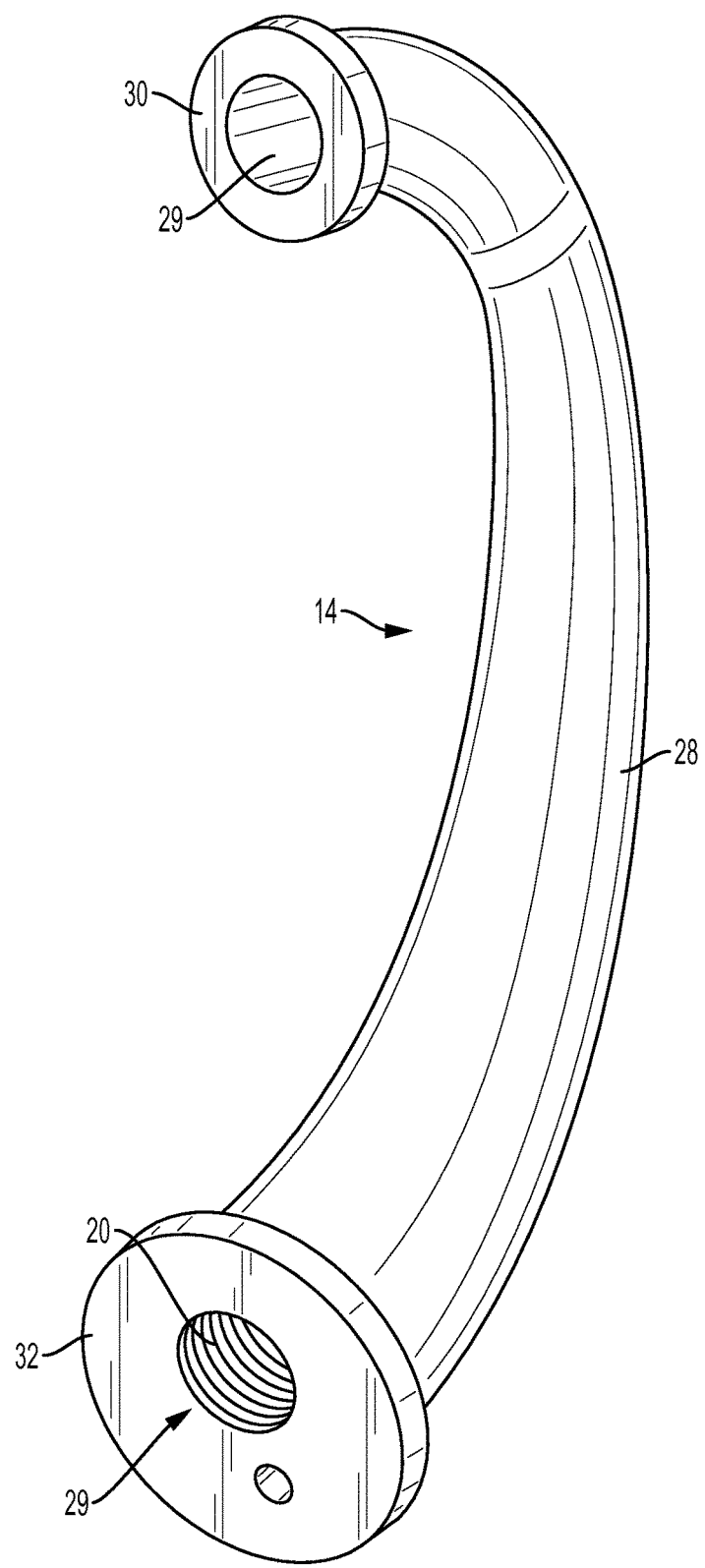
FIG. 3 is a perspective view of a plastic insert made for the faucet spout in FIG. 1.

Turning now to FIG. 3, the faucet spout 10 is made by first molding the plastic insert 14. The plastic insert 14 includes an elongated body 28 having an internal opening 29, a first flared end 30 at the first end 18 of the faucet, and a second flared end 32 at the second end 22. The opening extends from the first end 18 to the second end 22.

The insert 14 is made of ejection molded plastic that has a melting temperature after curing that is higher than many plastics. In one example, Celanese FORTRON 6165A6 PPS was successfully used. The melting point temperature of that plastic after curing is 536° F.

Figure 4:
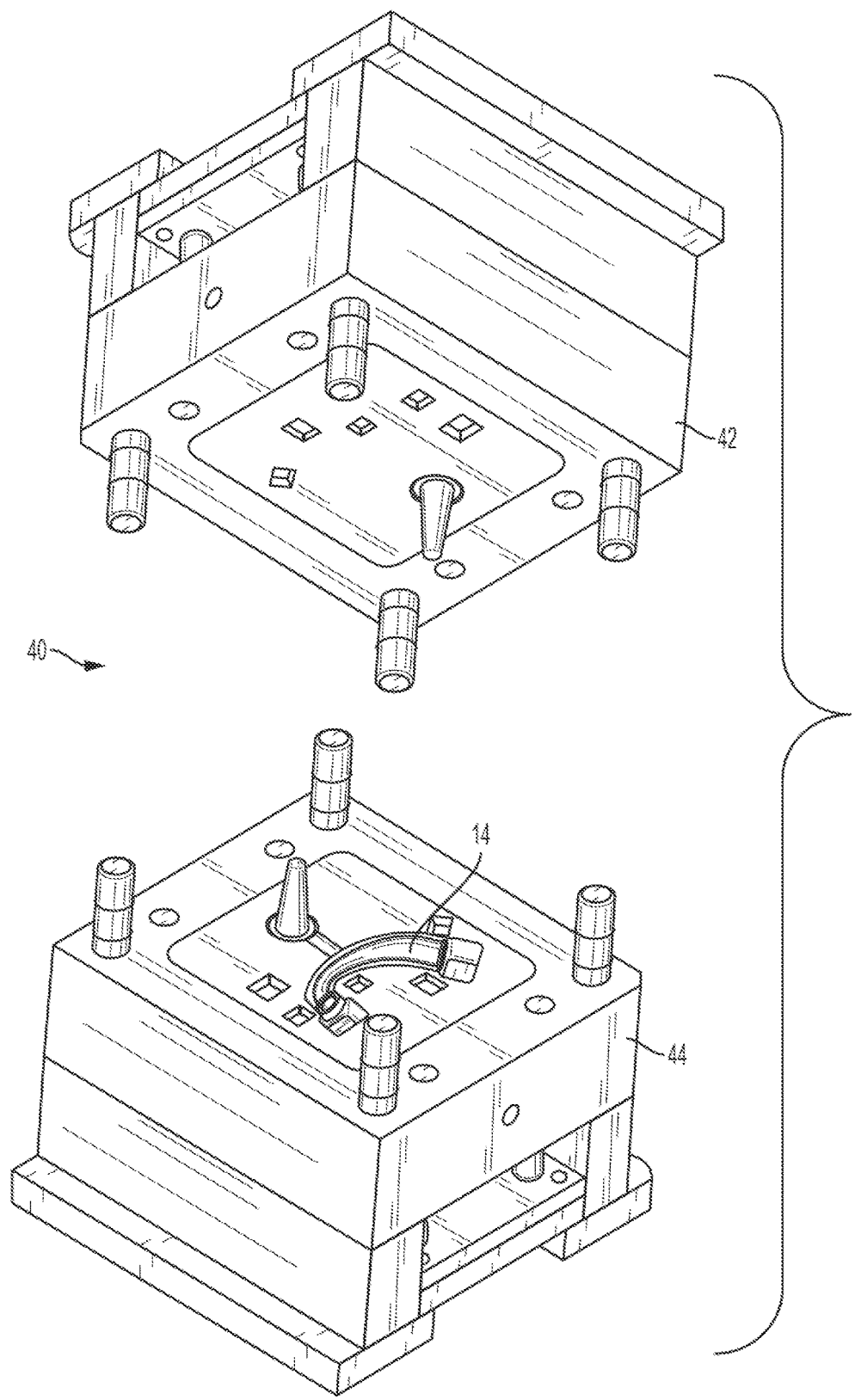
FIG. 4 is a perspective view of a mold used to make the housing of the faucet spout of FIG. 1.
Figure 5:
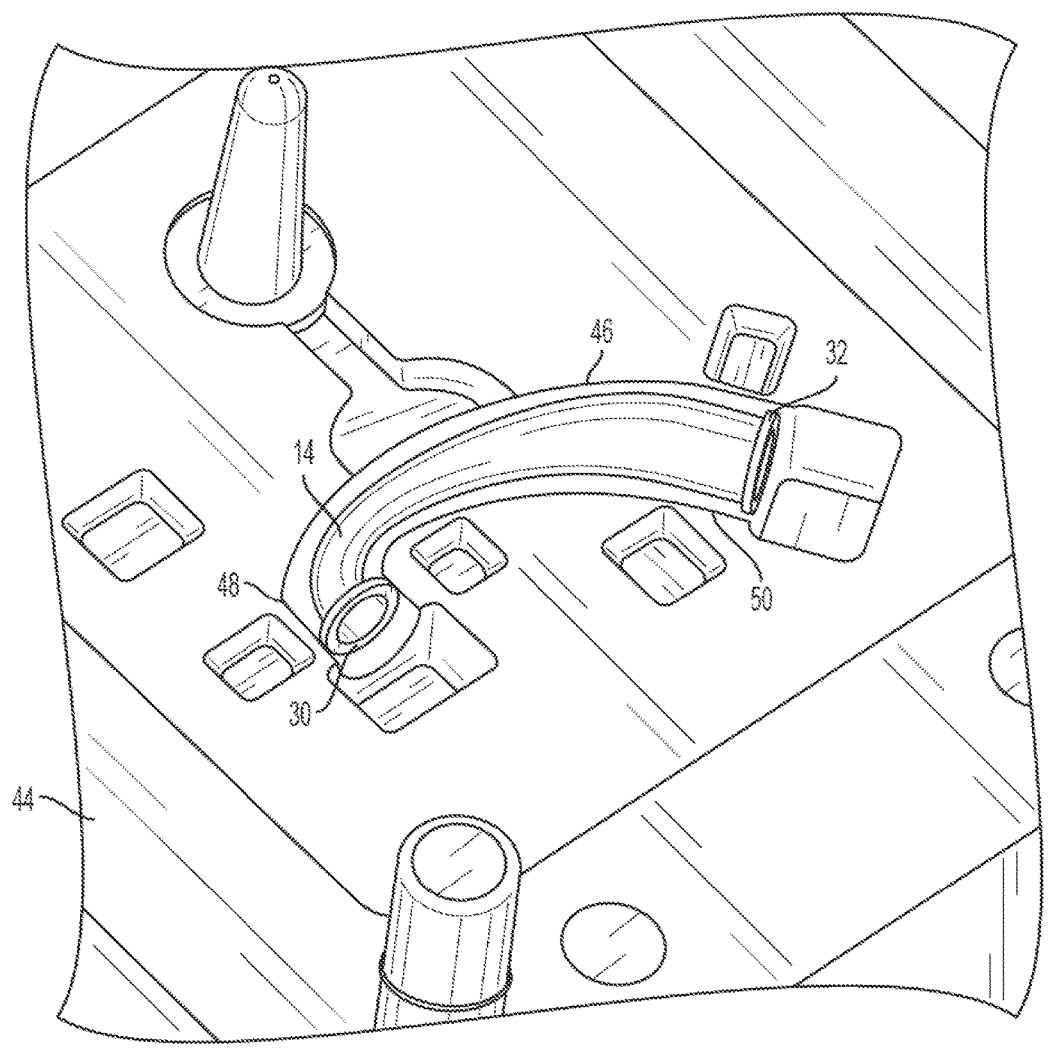
FIG. 5 is a perspective view of the bottom half of the mold of FIG. 4, with the plastic insert of FIG. 3.
Figure 6:
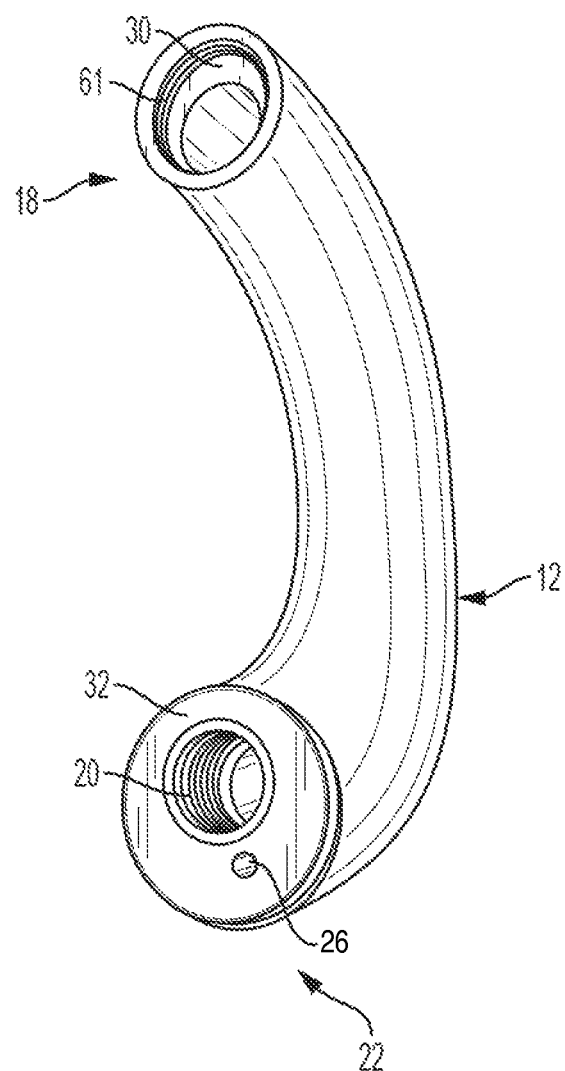
FIG. 6 is a perspective view of the faucet spout of FIG. 1 after the housing is molded.

The housing 12 is made in a metal mold 40 having a top mold half 42 and bottom mold half 44, as seen in FIG. 4. The bottom mold half 44 is shown in more detail in FIG. 5.

The bottom mold half 44 (FIG. 5) has a large cavity 46. Openings at the ends 30 and 32 are plugged to prevent molten metal from getting on the plastic insert. After the plastic insert 14 is placed in the bottom mold half 44, the top mold half 42 is aligned with the bottom half 44, and the housing 12 is molded by pouring liquid metal into the mold. Typical metals include zinc and aluminum. The melting temperature of zinc is about 787° F., and the melting temperature of aluminum is 1220° F.

In order to prevent the plastic from melting when the zinc is poured into the mold, the metal mold itself is heated or cooled to about 320° F. to 370° F., which is below the melting temperature of the cured plastic in the insert. The plastic does not melt because the zinc hardens and cools in less than five seconds, and preferably about two seconds to about four seconds during the casting process. In addition to protecting the plastic, the relatively low mold temperature before casting assures that the zinc surface of the finished product is shining.

The housing 12 is molded to extend to the flared end 32. Threads 20 are cut in an inside surface of the housing 12 for making a connection to a plumbing system.

At the first end 18, the housing 12 extends past the flared end 30 of the plastic insert 14, which leaves a surface 61 exposed. The surface 61 can be threaded to secure the filter 16 to the spout 10.

Figure 7:
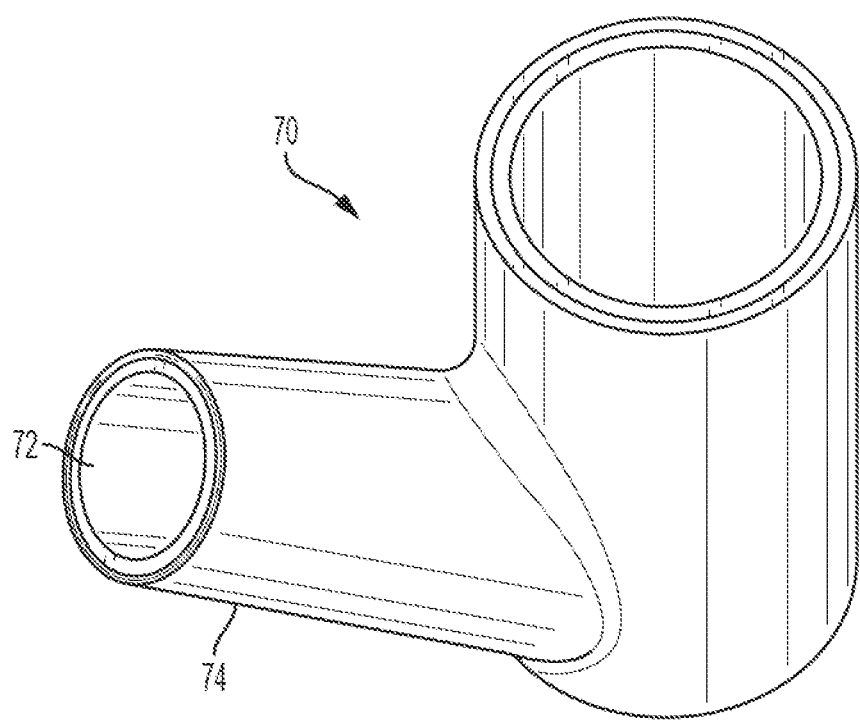
FIG. 7 is a cutaway view of another faucet component.

In FIG. 7, a faucet valve housing 70 has a plastic insert 72 and a metal housing 74. The plastic insert 72 and metal housing 74 can be made of similar materials, and molded in the same way as the embodiment of FIGS. 1 through 6. This illustrates the flexibility of the present invention in making a variety of faucet spouts and other faucet components.

It is now apparent that the housing can be molded with the plastic insert inside of the mold, producing a tight fit between the insert and the housing, and avoiding kinks.

While the principles of the invention have been described above in connection with specific apparatus and applications, it is to be understood that this description is made only by way of example and not as a limitation on the scope of the invention.

What is claimed is:

1. A method for manufacturing a faucet component comprising:
   molding a plastic insert having an elongated body and an opening extending through the elongated body from a first end to a second end, the plastic having a plastic melting temperature after the plastic insert is molded;
   establishing a heated metal mold to a temperature below the plastic melting temperature and sufficient to reduce the curing time of molten metal to less than five seconds;
   securing the plastic insert in the heated metal mold; and molding a housing in the heated metal mold by pouring molten metal into the heated metal mold, the housing being made of a metal having a metal melting temperature higher than the temperature of the metal mold and the plastic melting temperature, wherein the plastic melting temperature is high enough and the metal mold temperature is low enough so that the plastic is not melted by the molten metal.

2. The method of claim 1, wherein the faucet component is a faucet spout, the method comprising:

molding the insert to have a first flare at the first end and a second flare at the second end, the first flare and the second flare being inside of the metal housing after the metal housing is molded, and making threads inside of corresponding first and second ends in the housing, so that a threaded adaptor can be secured in the first end of the housing spout, and a filter can be secured in the second end of the housing.

3. The method of claim 1, comprising:

providing a second opening in the plastic insert coterminous with a third opening in the housing, the second opening and third opening being provided for a drain controller.

4. The method of claim 1, wherein the molten metal contains zinc and the plastic has a melting point temperature after curing of about 536° F.

5. The method of claim 4, wherein the metal mold is heated to about 320° F. to 370° F. before a molten metal is poured into the metal mold.

6. The method of claim 1, wherein the faucet component comprises a faucet spout.

7. The method of claim 1, wherein the faucet component comprises a faucet valve housing.

* * * * *